United States Patent

[11] 3,575,309

| [72] | Inventor | Wyatt B. Peterson<br>1003 Tanglewood Drive, Clinton, Miss. 39056 |
|---|---|---|
| [21] | Appl. No. | 772,641 |
| [22] | Filed | Nov. 1, 1968 |
| [45] | Patented | Apr. 20, 1971 |

[54] ON AND OFF CARGO LOADING MECHANISM
5 Claims, 6 Drawing Figs.

[52] U.S. Cl............................................ 214/520,
214/16.4, 214/75, 214/84
[51] Int. Cl............................................ B60p 1/44,
B60p 1/52
[50] Field of Search........................................ 214/16.4,
75 (T), 84, 518—520

[56] References Cited
UNITED STATES PATENTS

| 1,444,604 | 2/1923 | Haney | 214/84X |
| 2,521,727 | 9/1950 | Kappen | 214/518 |
| 2,635,771 | 4/1953 | Black | 214/75(T) |
| 3,104,910 | 9/1963 | Kappen | 214/(75(T)X |
| 3,142,396 | 7/1964 | Pauley et al. | 214/75(T)X |

Primary Examiner—Robert G. Sheridan
Attorneys—Gordon W. Hueschen and Talivaldis Cepuritis ABSTRACT: An apparatus for on-and-off loading of cargo in a truck body or the like including a plurality of vertically spaced horizontally extending motor-driven platforms enclosed within a cargo receiving area, each of said horizontal platforms comprising a plurality of spaced, propelled rollers and reversible drive means therefore for on-and-off loading; and a second vertically adjustable platform disposed adjacent an end of said spaced horizontal platforms comprising a plurality of spaced propelled rollers and reversible drive means therefore; and control means for selectively positioning said second platform relative to a determined one of said horizontal platforms and for actuating said drive means for said selected horizontal platform and said vertically adjustable platform whereby cargo may be selectively loaded and unloaded from said cargo storage space.

INVENTOR
WYATT B. PETERSON

BY Dean Lawrence

ATTORNEY

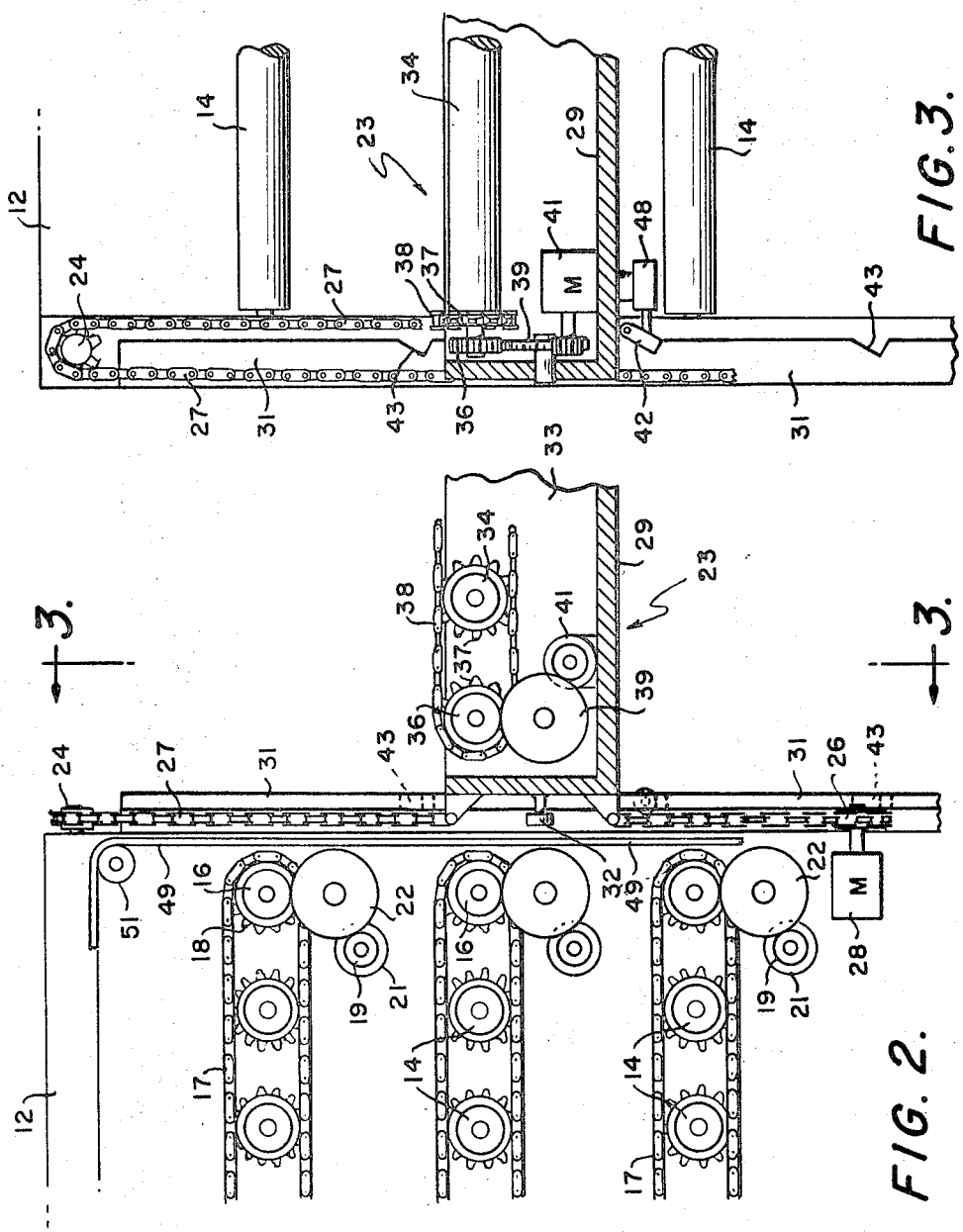

INVENTOR
WYATT B. PETERSON

BY Dean Lawrence
ATTORNEY

INVENTOR
WYATT B. PETERSON

BY Dean Lawrence
ATTORNEY

ON AND OFF CARGO LOADING MECHANISM

BACKGROUND OF INVENTION

An object of this invention is to provide mechanism for selective on-and-off loading of cargo in or from a truck body or the like arranged to operate in a vertical plane from near the ground level at the rear end of the truck body to the desired horizontal level of the cargo body floor and thence into the cargo body forward to the front of the cargo body floor during loading and including further means for reversing the operation to selectively load or unload cargo to or from selected horizontal levels or from the cargo body.

A further object of this invention is to provide on-and-off loading cargo mechanism for a delivery truck or the like for handling and transporting items of cargo in their original packaged forms without pallets, prestacking or cargo preparation.

Yet another object of this invention is to provide an on-and-off cargo loading mechanism for a cargo body including a plurality of fixed vertically spaced powered platforms, a vertically adjustable powered platform positioned adjacent an end of said horizontal platforms; and means for selectively operating said vertical platform to a determined vertical level and means for simultaneously actuating said selected horizontal platform and said vertically adjustable platform.

These and many other objects and advantages may be achieved by this invention which in general may include a plurality of fixed storage platforms vertically spaced one above the other in a truck body. Each of the horizontal platforms comprises a plurality of horizontally spaced rollers extending the width of the cargo body and drive means for reversibly rotating said rollers. An elevator positioned adjacent an end of the vertically spaced horizontal platforms includes a platform comprising a plurality of spaced, propelled rollers and drive means for reversibly rotating said rollers. Control means are provided for selectively operating said elevator to position the platform thereof adjacent to one of said fixed horizontal platforms, and further means for simultaneously operating said fixed horizontal platform and said elevator platform to transfer cargo to and from said respective platforms at selected horizontal levels.

A sliding door disposed between the fixed vertically spaced platforms and the elevator includes motor means for raising and lowering the door to selective heights as determined by the elevator control means.

Numerous other objects and advantages of the invention will become apparent from the following detailed description when read in view of the appended drawings wherein:

FIG. 2 is a side elevational view of the invention shown in FIG. 1 illustrating drive means for the horizontal cargo storing platforms and the elevator in greater detail;

FIG. 3 is a partial end view illustrating the elevator and transport and drive means therefore;

Although a preferred embodiment of the invention is illustrated for use in the cargo body of a motor vehicle it is to be understood that the invention may be used in all types of installations where selective storing, transferring and unloading of cargo is required.

Figure 1:
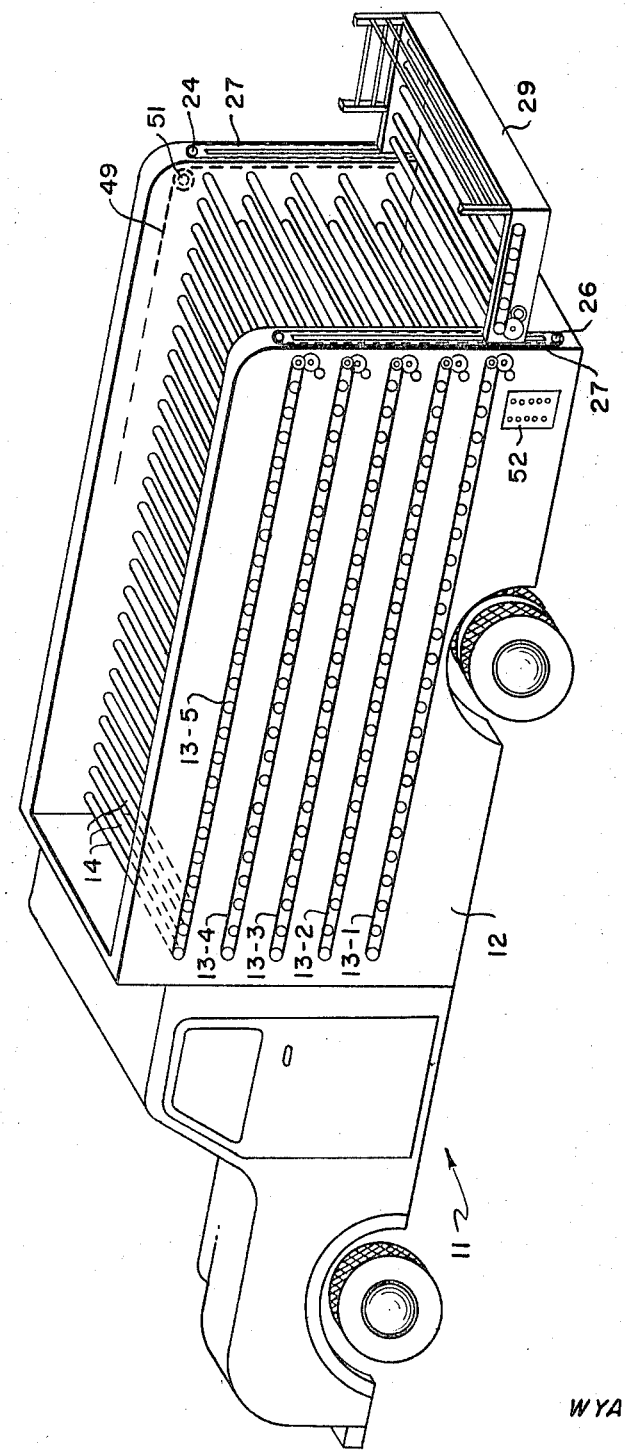
FIG. 1 is a schematic of a truck having a cargo body and an on-and-off cargo-loading mechanism in accordance with the principles of this invention illustrating a plurality of powered horizontal cargo storing platforms and an elevator for selective on-and-off loading of cargo within the cargo zone of the truck.

Referring now to the drawings and in particular to FIG. 1, a conventional delivery truck 11 having a closed cargo body 12 mounted thereon is illustrated. The cargo body 12 is equipped with five fixed floors (13-1 through 13-5) vertically spaced one above the other, each floor being of the same width as the cargo body 12 and extending substantially the entire length thereof. The floors 13-1 through 13-5 may be spaced at any height as determined by the size of the cargo to be loaded and unloaded from the respective floors. In a preferred embodiment, the floors are specially arranged for handling and transporting such items as bottled or canned soft drinks, alcoholic beverages and other similarly packaged items for retail outlet delivery. Each platform 13-1 through 13-5 comprises a plurality of horizontally spaced rotating propeller rollers 14 which may be formed of steel rods or tubing or other like material, preferably of lightweight construction. Each of the rollers 14 extends substantially the width of the cargo body 12 and are horizontally spaced from one another along the entire length of the cargo body. The spacing distance between the respective rollers is determined by the type of cargo to be handled. The powered, rotating cylindrical propeller rollers 14 are journaled at each end in suitable bearings 16 secured to the vertical sidewalls of the cargo body. A continuous link chain 17 extending the length of the cargo body is carried on sprocket rollers 18 affixed to both ends of each of the respective rollers. A sprocket 19 rotated by a reversible motor 21 rotates the drive sprocket 22 which in turn drives the chain 17 to rotate the propeller rollers 14. The size of the motor 21 and sprockets 18, 19 and 22 are determined by the type of cargo to be handled. Where heavy items are to be loaded and unloaded, a drive motor 21 may be employed at both ends of the forward and/or rear end rollers 14 of each platform 13-1 through 13-5.

An elevator designated by reference numeral 23 is mounted at the rear of the vehicle and includes a lift mechanism comprising a pair of upper sprockets 24, a pair of lower sprockets 26, and drive chains 27 driven by reversible motors 28 rigidly attached on either side and at the end of the cargo body. A lift or transport platform 29 is affixed to the drive chain at both ends and arranged for vertical adjustment on runners 31 by means of guide rollers 32 positioned on either side of the runner 31 and affixed to the lift platform 29. The lift platform 29 comprises a shallow box 33 in which are mounted a plurality of horizontally spaced rollers 34 journaled at either end in suitable bearings 36. The rollers have a sprocket 37 affixed to either end that receive and engage a continuous drive chain 38. A sprocket 39, driven by reversible motor 41 engages sprocket 37 mounted on the journaled end of the end roller 34 to drive the chains 38 and the rollers forming the platform.

Figure 4:
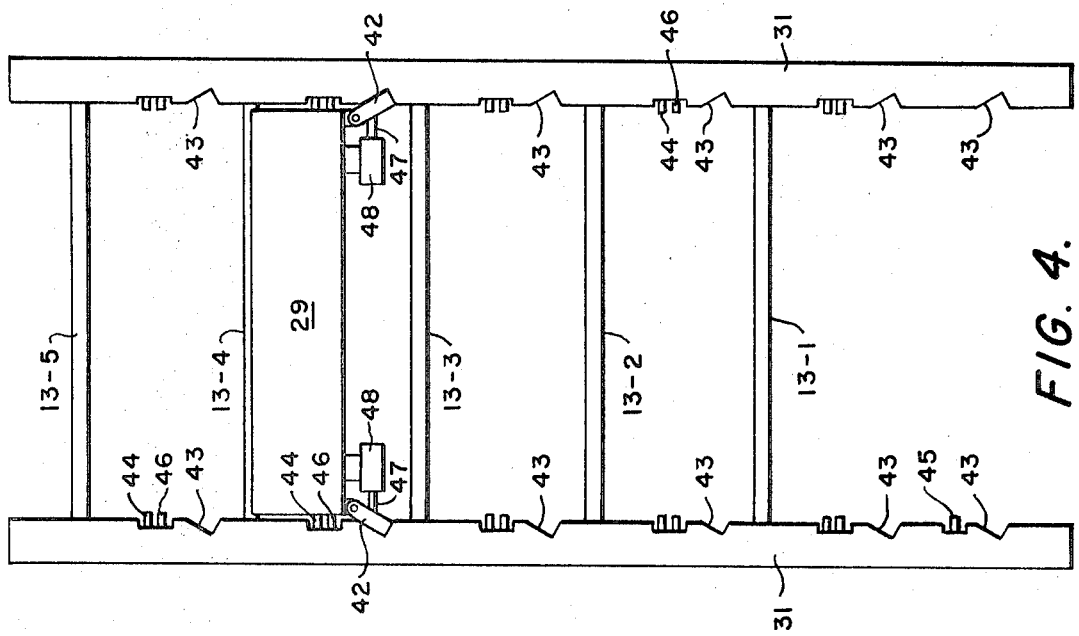
FIG. 4 is a sectional view along the lines 3-3 of FIG. 2 illustrating the elevator transport platform and horizontal platforms.

As shown in FIG. 4 the lift carries two spring-loaded latch arms 42 which depend from the lift 29 and are normally urged outwardly against the runners. The runners 31 are provided with notches 43 on either side at spaced intervals corresponding to the level of each platform 13-1 through 13-5. Recessed upper and lower limit switches 44 and 46 are positioned in each rail (31) above the notches 43. The latch arms 42 are pivotally connected to the lift and attached to a plunger 47 of solenoid 48, which when energized overcomes the spring resistance of the latch arm 42 pulling them inwardly free of the notches 43. A down limit switch 45 is also provided to secure the lift platform in the down position for road travel.

A sliding and folding overhead door 49 mounted in the top of the cargo body extends between the adjacent ends of the vertically spaced horizontal platforms 13-1 through 13-5 and the lift platform 29. The sliding door 49 is operated by means of a reversible motor 51 supported in a conventional manner.

Figure 5:
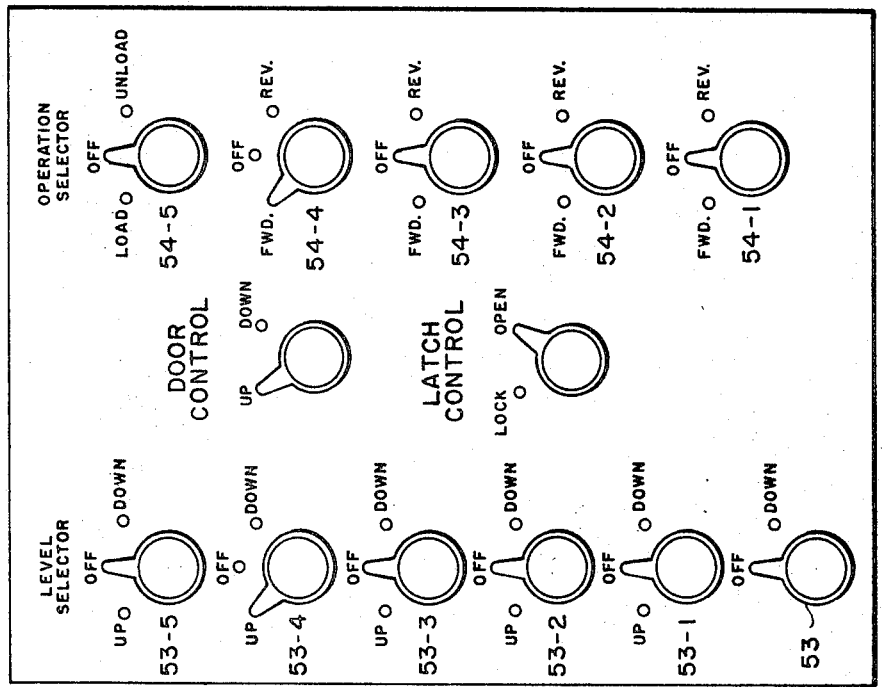
FIG. 5 is an enlarged view of a control panel.
Figure 6:
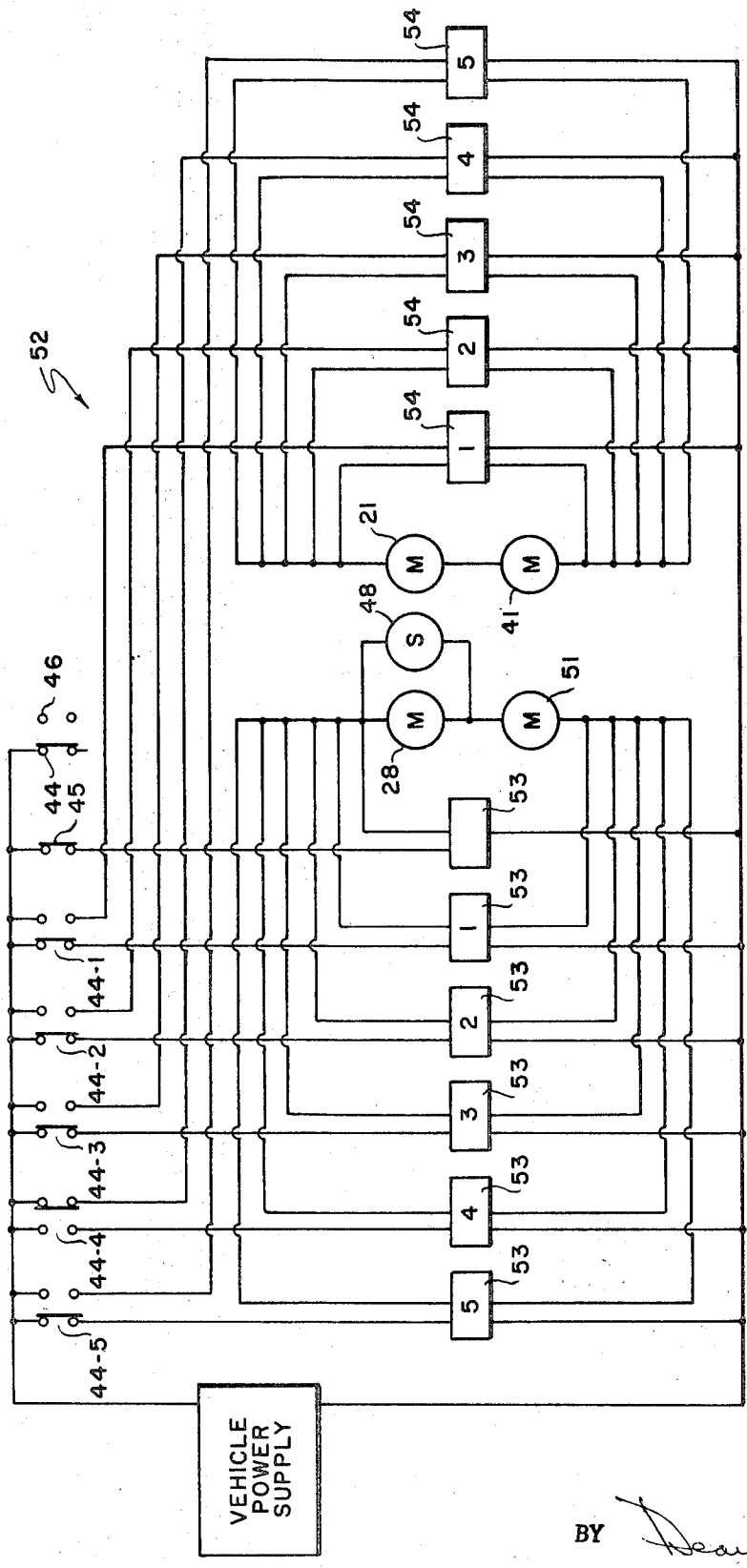
FIG. 6 is an electrical schematic of the control circuit of this invention.

Referring to FIGS. 5 and 6 the motors 21, 28, 41 and 51 and latch solenoids 48 are all connected to an exterior control panel 52 mounted near the rear of the cargo body of the vehicle which is connected to the vehicle power supply.

The control panel includes a down control switch 53 and five reversing lift selector level switches 53-1 through 53-5 corresponding to the platforms 13-1 through 13-5, each having an up, off and a down position and electrically connected to the lift motors 28 and the sliding-door motor 51.

Five operation selector switches 54-1 through 54-5, each having a load, unload, and off position are connected to the motors 19 at each platform level 13-1 through 13-5 and the lift platform drive motor 41. All circuits are completed through limit switches 44 and 46. All switches 53-1 through 53-5 in addition to reversing the voltage applied to the lift motors 28 includes means for momentarily operating the motors 28 in an up or forward direction when the switches 53-1 through 53-5 are thrown to the down position.

DESCRIPTION OF OPERATION

Referring now to FIG. 6, the operation of the invention will be described. Assuming the elevator is in the lowered position at platform 13-1 as shown in FIG. 1 and it is desired to load cargo on platform 13-5, unload cargo from platform 13-3 and load or transfer this cargo to platform 13-2. The operator throws reversible Level Selector switch 53-5 to the up position and Operation Selector switch 54-5 to the load position. At this time limit switches 44 and 46 are in the normal position (contacts 44 closed and contacts 46 open) as shown and switches 53-1 through 53-4 and 54-1 through 54-4 are in the off or open position.

Lift motors 28 and door motor 51 are then energized through limit switches 44 and switch 53-5. Motors 21 and 41 are not connected. As the lift 29 is raised by the chains 27 the latch arms 47 ride into and out of the notches 43 and over the limit switches 44 and 46 until the limit switch 44 is opened and 46 closed at platform 13-5 opening the circuits for motors 28 and 51 to stop the elevator. Contacts 46 are now closed and held in that position by the lift 29, to energize the motors 21 and 41 through switch 54-5. The spring loaded latch arms 42 are urged outwardly into the notches 43 to lock the platform 29 into position adjacent to platform 13-5 and at the same level. The door motor 51 has raised the door to permit cargo to pass between the platforms 13-5 and 29.

The platform 29 having closed contacts 46 energizes the motors 21 and 41 to automatically drive the propellor rollers 14 and 34 counterclockwise to advance cargo into the cargo body. Upon completion of the loading, switch 53-5 is turned to the "off" position, switch 53-3 thrown to the down position, and switch 54-3 thrown to the unload position.

Motors 28 and 51 are now reversed and energized through limit switches 44-3, 44-6 and selector switch 53-3. The elevator is lowered until the lift 29 opens limit switch 44 and closes limit switch 46 opening the circuit for motors 28 and 51 and closing the circuit for motors 21 and 41. Each switch 53-1 through 53-5 is arranged to momentarily energize motor 28 to raise the lift 29 before reversing the motor 28 and energizing the solenoids 48. This permits the solenoids 48 to more easily retract and hold the latch arms 42.

When the lift 29 reaches and opens limit switch 44 solenoids 48 are deenergized releasing the latch arms 42 which because of the springs are forced into the notches 43 to lock the lift into position. At the same time motors 21 and 41 are energized through limit switch 46, and rotate the propeller rollers in a clockwise direction to unload cargo from platform 13-3 onto the platform 29.

When the unloading operation is completed, level selector switch 53-3 is thrown to the off position, 53-2 is thrown to the down position, operation switch 54-3 thrown to the off position and 54-2 thrown to the load position and the previous described operation is repeated. To lower the lift platform 29 to the travel position operation selector switch 54-2 and level selector switch 53-2 are thrown to the off position, and down switch 53 closed. The motor 28 is momentarily energized to raise lift platform 29 permitting solenoids 48 to withdraw latch arms 42. The lift platform 29 is then lowered to the transport position where it trips limit switch 45 to open the motor circuits 28 and 51 and release the latch arms which enter notches 43 to lock the lift platform into the travel and load position.

Thus it is seen that this invention permits cargo to be selectively loaded on and unloaded from the platforms 13-1 through 13-5. Further when required cargo may be changed from one platform level to another without returning the elevator to the lowest or down position. When not in use, the elevator is normally maintained in a lower travelling position. Also if desired, a separate circuit may be provided for operating the door independently rather than with the lift motor 28.

Although a preferred embodiment of the invention has been described in detail, numerous changes and modifications may be made within the scope of this invention which is to be limited only by the appended claims.

I claim:

1. A loading and unloading device for handling of cargo in the cargo's original package form without use of pallets, said device adapted to be disposed in the cargo-carrying zone of a vehicle comprising:
   a. a frame disposed in said cargo zone having a plurality of horizontally extending spaced apart member substantially coextensive with the length of the cargo zone;
   b. a plurality of sets of load-supporting rollers substantially coextensive with the width of said cargo zone wherein each set is spaced vertically from an adequate set and the outer surfaces of said rollers are formed to adequately move a load disposed thereon;
   c. means for journaling the opposite ends of said rollers in respective axes of the horizontal members of said frame;
   d. means for effecting rotational movement of said rollers about the longitudinal axes thereof in said cargo zone and said platform including sprocket means affixed to at least one of the respective ends of said rollers, chain means drivingly interconnecting said sprocket means, and motor means for driving said chain means.
   e. a load-supporting platform mounted for vertical movement adjacent an end of said set of horizontally arranged rollers said platform including a plurality of spaced apart horizontally arranged load supporting rollers;
   f. means for effecting rotational movement of said rollers, included in the lift platform, about the longitudinal axes thereof; and
   g. a door disposed between said storage platforms and said lift platform; and drive means responsive to said control means for raising and lowering said door simultaneously with said lift platform.

2. A loading and unloading device as defined in claim 1 including means for effecting selective up and down movement of said platform.

3. An on-and-off loading mechanism according to claim 2, comprising:
   a. a plurality of vertically spaced, horizontally disposed cargo storage platforms, said storage platforms including a plurality of horizontally spaced rollers;
   b. a first drive means for reversibly rotating said rollers forming said storage platforms;
   c. a lift platform disposed adjacent an end of said vertically spaced platforms, said lift including a plurality of horizontally spaced rollers;
   d. a second drive means for reversibly rotating said lift rollers;
   e. a third drive means for vertically reciprocating said lift platform; and,
   f. control means for selectively operating said first, second and third drive means and responsive to said lift platform for positioning said lift platform relative to said respective storage platforms and for rotating said rollers of said selected storage platforms and of said lift platform whereby cargo may be selectively loaded on-and-off and transferred to and from said storage platforms.

4. Apparatus as defined in claim 3, including latch means for releasably locking said lift platform into position relative to selective ones of said storage platforms.

5. Apparatus as defined in claim 4, wherein said latch means comprises:
  a. a pair of spaced rails extending vertically between said storage platforms and said lift platform;
  b. oppositely disposed notches formed in said respective rails adjacent each storage platform;
  c. limit switches positioned adjacent said notches and connected to said control means for stopping said third drive means;
  d. a spring-loaded latch for normally urging said latch outwardly in said notches to lock said lift in position; and actuator means responsive to said control means for withdrawing said latch from said notches when said lift is moved downwardly.